(12) United States Patent
Biblarz et al.

(10) Patent No.: US 9,194,379 B1
(45) Date of Patent: Nov. 24, 2015

(54) FIELD-IONIZATION BASED ELECTRICAL SPACE ION THRUSTER USING A PERMEABLE SUBSTRATE

(75) Inventors: Oscar Biblarz, Carmel, CA (US); Marcello Romano, Monterey, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1163 days.

(21) Appl. No.: 13/024,530

(22) Filed: Feb. 10, 2011

Related U.S. Application Data

(60) Provisional application No. 61/303,059, filed on Feb. 10, 2010.

(51) Int. Cl.
*F03H 1/00* (2006.01)
*F03H 99/00* (2009.01)
*B64G 1/40* (2006.01)

(52) U.S. Cl.
CPC *F03H 1/00* (2013.01); *B64G 1/405* (2013.01); *F03H 1/0012* (2013.01); *F03H 1/0025* (2013.01); *F03H 99/00* (2013.01)

(58) Field of Classification Search
CPC ....... F03H 1/0075; F03H 1/00; F03H 1/0018; F03H 1/0037; F03H 1/0043; F03H 1/0068; F03H 1/0062; F03H 1/0012; F03H 1/0056; F03H 1/0025; B64G 1/405
USPC .......................................... 60/202; 313/359.1
See application file for complete search history.

(56) References Cited

U.S. PATENT DOCUMENTS

| | | | | |
|---|---|---|---|---|
| 3,157,988 A | * | 11/1964 | Schultz | 60/202 |
| 3,852,595 A | * | 12/1974 | Aberth | 250/288 |
| 4,733,530 A | * | 3/1988 | Beattie et al. | 60/202 |
| 5,689,950 A | * | 11/1997 | Smith | 60/202 |
| 2003/0146757 A1 | * | 8/2003 | Aguero et al. | 324/453 |
| 2003/0197462 A1 | * | 10/2003 | Pavlovsky et al. | 313/495 |
| 2006/0280524 A1 | * | 12/2006 | Hays et al. | 399/168 |
| 2009/0056305 A1 | * | 3/2009 | Gilchrist et al. | 60/219 |
| 2009/0283693 A1 | * | 11/2009 | Hsu et al. | 250/423 F |
| 2011/0005191 A1 | * | 1/2011 | Ready et al. | 60/202 |

OTHER PUBLICATIONS

Busek "Field Emission Cathodes" 2006 https://web.archive.org/web/20061110034858/http://www.busek.com/cathodes.html.*
Hicks, Troy C., "A Carbon Nanotube Pillar Array Ionizer for Miniature Ion Thruster Applications," Thesis, Naval Postgraduate School, Dec. 2008, pp. 1-97.
Forrester, A.T. and R.C. Speiser. Cesium-Ion Propulsion. Astronautics, vol. 4, No. 10, Oct. 1959. pp. 34-35, 92, 94, 96, 97.

* cited by examiner

*Primary Examiner* — Phutthiwat Wongwian
*Assistant Examiner* — William Breazeal
(74) *Attorney, Agent, or Firm* — Naval Postgraduate School; Lisa A. Norris

(57) ABSTRACT

A field-ionization based electrical ion thruster utilizes a single propellant that can be used in either a high specific-impulse mode, i.e., ion-thruster mode, or a low-specific-impulse mode, i.e., a cold-gas thruster mode. In one embodiment, the high specific impulse mode (ion thruster mode) utilizes a miniaturized positive-ion field-ionization chamber including a permeable substrate infused with properly oriented carbon nanotubes (CNTs), which is fed propellant from a porous injection plug made from permeable carbon or equivalent material. In one embodiment, field-electron emission from a neutralizer, such as a carbon nanotube array neutralizer, positioned after one or more accelerator grids is used for ion neutralization. In one embodiment, the low specific-impulse (cold-gas mode) uses a conventional supersonic nozzle-expansion to generate thrust. In one embodiment, both the high specific-impulse mode and the low specific-impulse mode thruster embodiments share the same gas propellant, storage propellant tank, and delivery equipment.

12 Claims, 3 Drawing Sheets

FIELD-IONIZATION BASED ELECTRICAL SPACE ION THRUSTER USING A PERMEABLE SUBSTRATE

CROSS-REFERENCE TO RELATED APPLICATIONS

This application claims the benefit of U.S. Provisional Patent Application No. 61/303,059, filed Feb. 10, 2010, which is hereby incorporated in its entirety by reference.

BACKGROUND OF THE INVENTION

1. Field of the Invention

The present invention relates generally to space ion thrusters.

2. Description of the Related Art

Ion thrusters have the capability to provide constant thrust with a high specific impulse for years. Thus ion thrusters have been utilized in spacecraft for long duration and inter-planetary missions. Current designs for ion thrusters use electron collision for propellant ionization.

Electron collision ionization sources bombard a gas atom with electrons that are emitted from a heated cathode. As the electrons collide with the gas atoms, they knock off one or more electrons. A relatively large chamber with magnets or RF fields to increase the electron path is required to maximize ionization. The newly created ions are drawn toward negatively-charged acceleration grids. Once the particles pass through these grids, they are sprayed with electrons from a conventional hollow-cathode source to neutralize the charged atoms.

The small amount of propellant mass required to operate ion thrusters for such a long time also makes ion thrusters attractive for use in small satellites and CubeSats; however, the size and mass of the electron bombardment chamber required for ionization to occur is too large for use in small satellites and CubeSats.

SUMMARY OF THE INVENTION

In accordance with one embodiment, a field-ionization based electrical ion thruster includes: a gas propellant inlet for dispersing an injected gas propellant into a positive-ion field-ionization chamber; and a positive-ion field-ionization chamber coupled with the gas propellant inlet. In one embodiment, the positive-ion field ionization chamber includes: a permeable ionizer substrate for receiving the gas propellant, and for producing positive ions of the gas propellant and freed electrons by field ionization, and one or more accelerator grids positioned after the permeable ionizer substrate, the accelerator grids for accelerating the positive ions of the gas propellant away from the permeable ionizer substrate to produce an ion beam. In one embodiment, the thruster further includes a neutralizer positioned after the accelerator grids for neutralizing the positive ions. In one embodiment, an external circuit coupling the permeable ionizer substrate with the neutralizer transfers the freed electrons from the permeable ionizer substrate to the neutralizer. In various embodiments, the permeable ionizer substrate is infused with nano-materials, such as suitable arrays of carbon nanotubes (CNTs), W-nanorods, β-SiC nanorods, Zn—O nanopencils, and/or other nanowires, singly or in combination, to accomplish the production of positive ions from a desired propellant by field ionization.

Embodiments in accordance with the invention are best understood by reference to the following detailed description when read in conjunction with the accompanying drawings.

DETAILED DESCRIPTION OF THE INVENTION

Broadly viewed, embodiments for small satellites and CubeSats provide a dual propulsion system using a single-propellant source that can be used in either a high specific impulse mode, also termed herein an ion-thruster mode, or a low specific impulse mode, also termed herein a cold-gas thruster mode. In one embodiment, the high specific impulse mode includes a miniaturized positive-ion field-ionization chamber which includes a permeable ionizer substrate, such as carbon nanotubes (CNTs) or other nano-materials, which is fed propellant from a porous injection matrix, i.e., a porous plug for flow control, made from permeable carbon or other permeable material. In one embodiment, field-electron emission from a neutralizer, such as a carbon nanotube array neutralizer, positioned downstream of accelerator grids is used for ion neutralization. In one embodiment, the low specific impulse mode uses a conventional supersonic nozzle-expansion to generate thrust. In one embodiment, both the high specific impulse mode and the low specific impulse mode share the same propellant gas, the same storage propellant tank, and the same delivery equipment.

High Specific-Impulse, Ion Thruster Mode

Embodiments in accordance with a high specific impulse embodiment of the invention utilize a permeable ionizer substrate, such as suitable arrays of carbon nanotubes (CNTs), W-nanorods, β-SiC nanorods, Zn—O nanopencils, and/or other nanowires, singly or in combination, to accomplish the production of positive ions from a desired propellant by field ionization. This production of positive ions requires an intimate, i.e., high cross-section, interaction between suitably positioned nano-tips, each locally at about $10^{10}$ V/m, and the propellant gas molecules or atoms to be ionized. In various embodiments, argon (Ar), krypton (Kr), or xenon (Xe) gas is used, however, in other embodiments, other gases may be used. In one embodiment, the configuration of components for the propellant supply is designed to match the ionizer/accelerator/neutralizer configuration, as further described herein with reference to FIG. 1.

Figure 1:
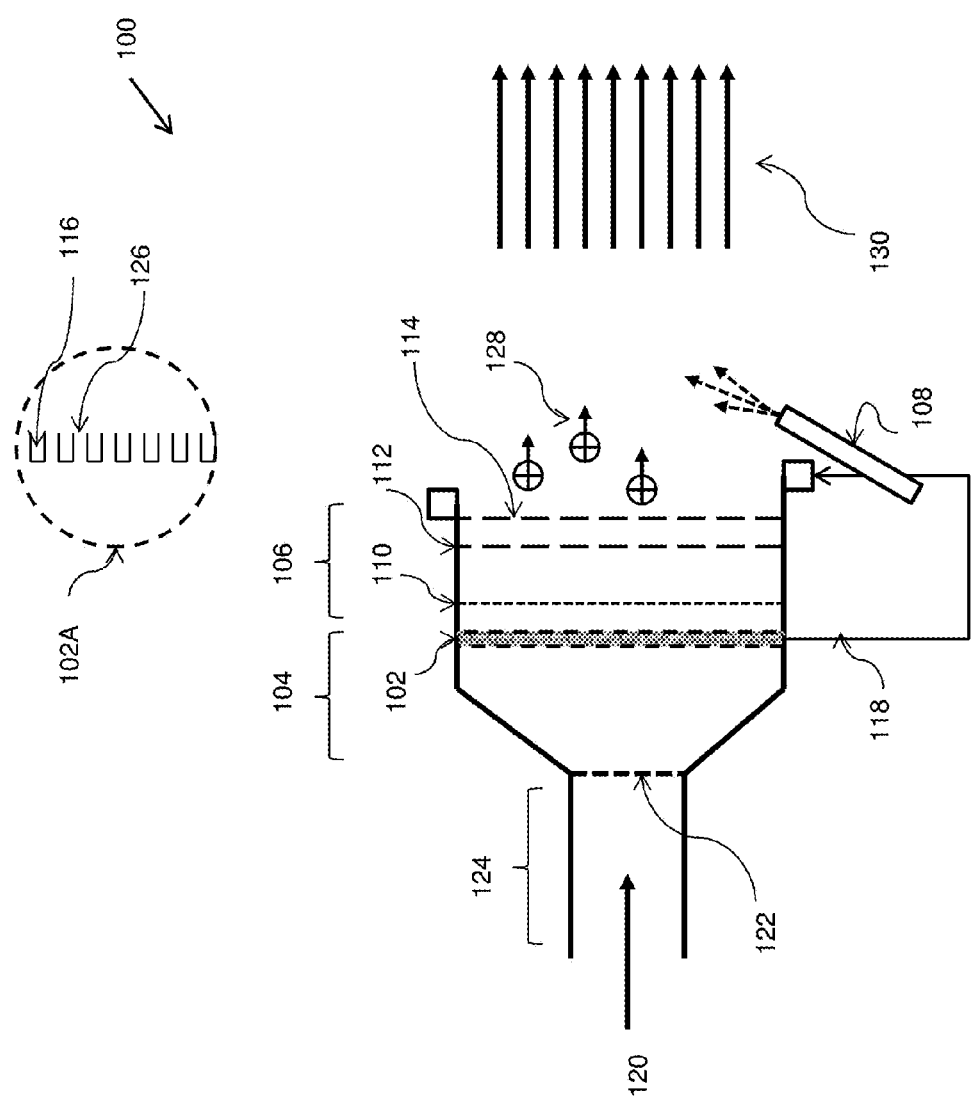
FIG. 1 illustrates a field-ionization based electrical ion thruster using a permeable ionizer substrate in accordance with one embodiment.
Figure 2:
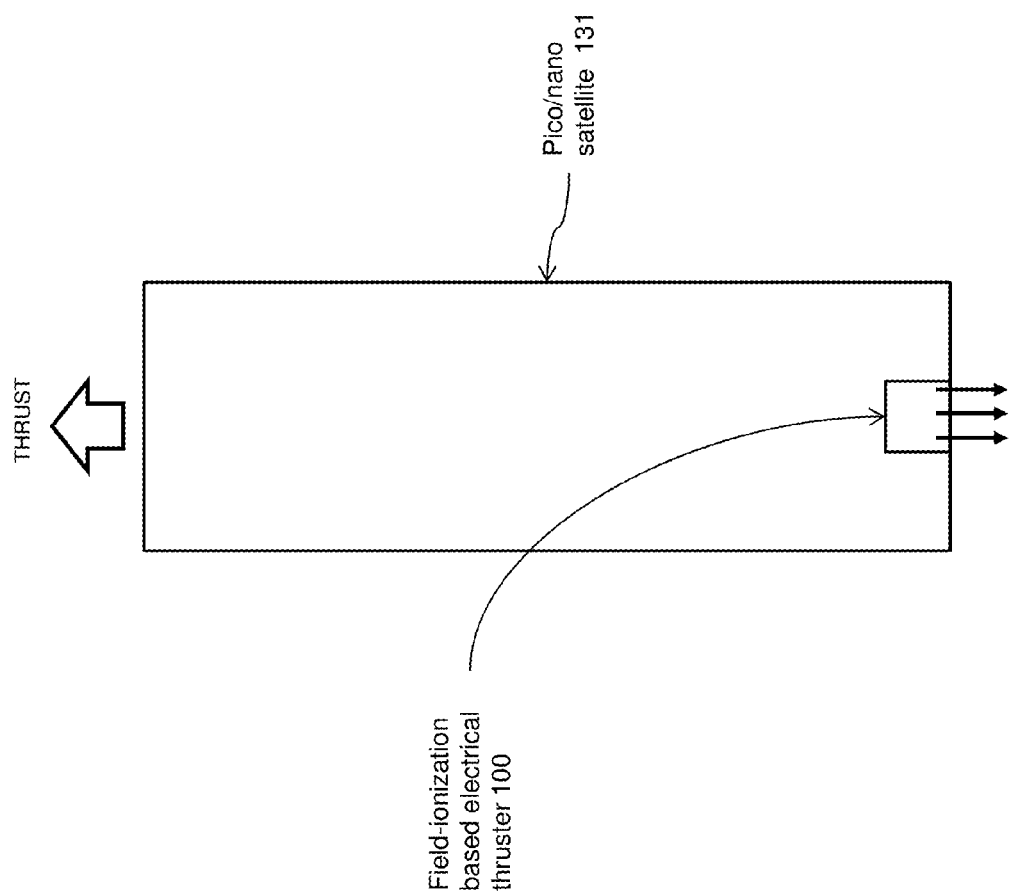
FIG. 2 illustrates a pico/nano satellite having a field-ionization based electrical ion thruster.
Figure 3:
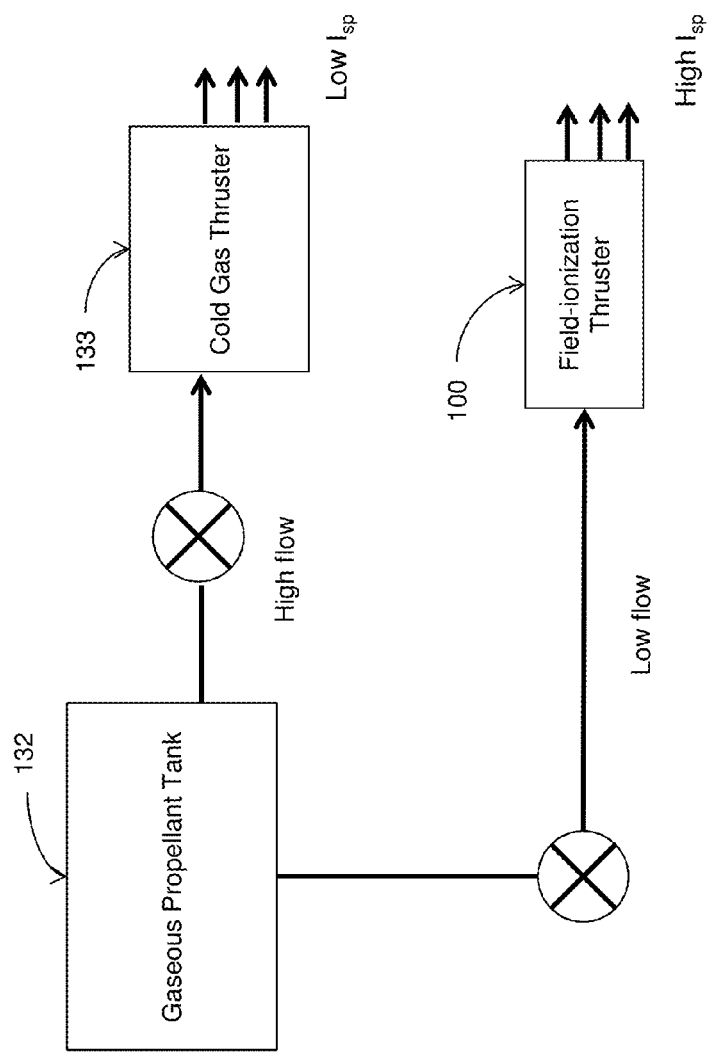
FIG. 3 illustrates a source of gas propellant feeding a field-ionization based electrical thruster and a cold gas thruster in parallel.

FIG. 1 illustrates a field-ionization based electrical ion thruster 100 which utilizes a permeable ionizer substrate 102 in accordance with one embodiment. Referring to FIG. 1, in one embodiment, a gas propellant 120 is injected into a propellant inlet 124 having a porous plug(s) 122 or equivalent flow control component. Porous plug(s) 122 is commonly made of permeable carbon, sintered tungsten, or silicon carbide or other refractory metal, but silicon itself is not excluded. For example, porous plug(s) 122 configurations in conjunction with cesium-surface ionization devices are formed where tungsten grains are compressed and sintered together to form a porous matrix. In order to provide a uniform pore distribution, the tungsten grains are spherodized and separated into narrow size fractions on the order of 2 to 4 microns in diameter. For further details on porous plug configurations see A. T. Forrester and R. C. Speiser, "Cesium Ion Propulsion"; *Astronautics,* 4, 34, October 1959 herein incorporated by reference in its entirety. FIG. 2 shows a pico/nano satellite (131) having a field-ionization based electrical ion thruster (100). FIG. 3 shows a source of gas propellant (132) feeding a field-ionization based electrical thruster (100) and a cold gas thruster (133) in parallel.

Porous plug(s) 122 is utilized to throttle propellant 120 down from higher-pressure supply tanks (not shown) into a field-ionization chamber 104, and to more evenly distribute propellant 120 atoms along a permeable ionizer substrate 102.

In one embodiment, permeable substrate 102 is formed of arrays of carbon nanotubes (CNTs), W-nanorods, β-siC nanorods, Zn—O nanopencils, other nanowires, and/or other nano-materials, singly or in combination, to accomplish the production of positive ions from propellant 120 by field ionization. In one embodiment, as illustrated in FIG. 1, permeable substrate 102 is formed with carbon nanotubes. As illustrated in the magnification illustration 102A, permeable substrate 102 is formed of an array of carbon nanotubes having carbon nanotubes 116 and open spaces 126 between carbon nanotubes 116. In one embodiment, to accomplish high field enhancement factors (β's) at the tips, carbon nanotubes 116 are grown with selected optimum height and spacings. In one embodiment, βs of over 2000 are utilized in order to establish the high electric local fields needed for field ionization while the field in the overall gap (V/d) remains below vacuum breakdown.

In one embodiment, the nanotubes on permeable substrate 102 are located facing an accelerator grid(s) 106 downstream in a low pressure region. In one embodiment, accelerator grid(s) 106 includes 2 or 3 electrodes in an arrangement which has high perveance >50%. In one embodiment, accelerator grid(s) 106 includes a gate electrode 110, a lens electrode 112, and an accelerator electrode 114.

In one embodiment, in order to utilize propellant gas 120, for example, argon (Ar), most efficiently, higher specific-impulse ranges of applications are used, such as above 5,000 sec, such that any disadvantages due to argon's high ionization potential relative to xenon are minimized. Herein the use of seconds to refer to specific impulse units is well known to those of skill in the art and not further detailed herein.

In one embodiment, gate electrode 110 feeds newly formed positive ions from permeable substrate 102 toward accelerator grid(s) 106. Electrons freed during the ionization are transported through carbon nanotubes 116, for example in permeable substrate 102, externally through a metallic circuit 118 and then to a downstream neutralizer 108. In one embodiment, neutralizer 108 can also operate with field electron-emitters instead of a hollow-cathode electron-source neutralizer which requires internal high temperatures and propellant flow to operate. In one embodiment, neutralizer 108 geometry is integral with the openings of the last grid in accelerator grid(s) 106, conforms to accelerator electrode 114 geometry, and allows for the self-generation of high field regions at the emitter tips. The accelerated ions 128 and resultant neutral beam 130 exiting thruster 100 provide the generation of thrust.

When compared to conventional electron-bombardment-ionization in the prior art, embodiments in accordance with the invention form only singly-charged positive ions by field ionization. The positive ion is electrostatically repelled from the ionizer surface because it is an anode, obviating the ion-impingement electrode damage that has plagued the prior-art cathodes. This translates into longer lifetimes. Further, no magnets are required and no extra propellant need be wasted in neutralization when field emission neutralizers are implemented.

Miniaturized embodiments in accordance with the invention can decrease the physical depth dimension of an ionizer by a minimum of 80%—not the cross section. This allows scaling down of associated thrusters for nano- and pico-satellite applications.

Low Specific Impulse, Cold-Gas Mode

In one embodiment, when not thrusting in the high specific-impulse mode described above, all electrical inputs relevant to the low specific-impulse mode (cold-gas mode) are deactivated and the appropriate valving is activated to operate the cold gas nozzle or nozzles system. Moreover, the low molecular mass gas, for example, argon, can efficiently act dually as a cold-gas propellant where very low $I_{sp}$ applications, about 100 sec, are most appropriate.

This disclosure provides exemplary embodiments of the invention. The scope of the invention is not limited by these exemplary embodiments. Those of skill in the art can understand that embodiments in accordance with the invention can also be scaled up or down in size to accommodate various applications. Numerous variations, whether explicitly provided for by the specification or implied by the specification or not, may be implemented by one of skill in the art in view of this disclosure.

We claim:

1. A field-ionization based electrical thruster comprising:
a gas propellant inlet configured to receive gas propellant from a source of gas propellant;
a positive-ion field-ionization chamber;
a porous plug, wherein said gas propellant inlet is in fluid communication with said positive-ion field-ionization chamber through said porous plug, and said porous plug is configured to disperse said gas propellant into said positive-ion field-ionization chamber;
said positive-ion field-ionization chamber comprising a permeable ionizer substrate downstream in a flow wise direction from said porous plug, wherein said permeable ionizer substrate is configured to receive said gas propellant from said porous plug and to produce positive ions of said gas propellant and freed electrons by field ionization,
a plurality of electrodes positioned downstream of said permeable ionizer substrate, said plurality of electrodes configured to receive said positive ions and to accelerate said positive ions away from said permeable ionizer substrate to produce an ion beam, wherein said plurality of electrodes comprises:
at least one gate electrode;
at least one lens electrode positioned downstream of said at least one gate electrode; and
at least one accelerator electrode positioned downstream of said at least one lens electrode;
a neutralizer positioned downstream of said plurality of electrodes, wherein said neutralizer is configured to electrically neutralize said ion beam; and
an external circuit coupling said permeable ionizer substrate with said neutralizer, wherein said external circuit is configured to transfer said freed electrons from said permeable ionizer substrate to said neutralizer.

2. The field-ionization based electrical thruster of claim 1, wherein said plurality of electrodes are configured to provide a perveance greater than 50% and less than 100%.

3. The field-ionization based electrical thruster of claim 1, wherein said permeable ionizer substrate is formed of at least one of an array of: carbon nanotubes (CNTs), W-nanorods, β-SiC nanorods, Zn—O nanopencils, and other nanowires.

4. The field-ionization based electrical thruster of claim 1, wherein said neutralizer is a carbon nanotube array neutralizer.

5. The field-ionization based electrical thruster of claim 1, wherein said permeable ionizer substrate is infused with carbon nanotubes (CNTs).

6. The field-ionization based electrical thruster of claim 1, wherein said porous plug is formed from permeable carbon.

7. A nano-satellite having the field-ionization based electrical thruster of claim 1.

8. A pico-satellite having the field-ionization based electrical thruster of claim 1.

9. A spacecraft propulsion system comprising the field-ionization based electrical thruster of claim 1 and a cold gas thruster, wherein said cold gas thruster is configured to receive gas propellant from the source of gas propellant and to exhaust said gas propellant to generate thrust.

10. A method for generating field-ionization based electrical thrust comprising:
    dispersing a gas propellant through a porous plug into a positive-ion field-ionization chamber, said positive-ion field-ionization chamber comprising:
        a permeable ionizer substrate for receiving said gas propellant, and a plurality of electrodes positioned downstream in a flow wise direction from said permeable ionizer substrate, wherein said plurality of electrodes comprises:
            at least one gate electrode,
            at least one lens electrode positioned downstream of said at least one gate electrode, and
            at least one accelerator electrode positioned downstream of said at least one lens electrode;
    ionizing said gas propellant on said permeable ionizer substrate to produce positive ions of said gas propellant and freed electrons by field-ionization;
    accelerating said positive ions away from said permeable ionizer substrate with said plurality of electrodes to generate an ion beam with resultant thrust;
    transferring said freed electrons to a neutralizer through an external circuit coupling said permeable ionizer substrate with said neutralizer; and
    neutralizing said ion beam with said freed electrons to produce a neutral beam.

11. The method of claim 10 wherein said permeable ionizer substrate is formed of at least one of an array of carbon nanotubes (CNTs), W-nanorods, β-SiC nanorods, Zn—O nanopencils, and other nanowires.

12. A method of generating thrust for a spacecraft having a spacecraft propulsion system according to claim 9, the method comprising:
    providing gas propellant to said cold gas thruster; and
    exhausting said gas propellant from said cold gas thruster to generate thrust.

* * * * *